United States Patent [19]
Ikeda et al.

[11] Patent Number: 5,880,544
[45] Date of Patent: Mar. 9, 1999

[54] FLYWHEEL-TYPE POWER STORAGE DEVICE

[75] Inventors: Tetsufumi Ikeda, Kawasaki; Takahiko Itoh, Tokyo, both of Japan

[73] Assignee: Nippon Oil Co., Ltd., Japan

[21] Appl. No.: 847,680

[22] Filed: Apr. 28, 1997

Related U.S. Application Data

[63] Continuation-in-part of Ser. No. 389,172, Feb. 15, 1995, abandoned.

[30]    Foreign Application Priority Data

Feb. 16, 1994  [JP]  Japan ........................................ 6-40615

[51] Int. Cl.⁶ ............................ H02K 7/02; H02K 21/22; H02K 29/06
[52] U.S. Cl. .............................. 310/74; 310/90; 310/254; 310/266; 74/572
[58] Field of Search ............................... 310/74, 266, 89, 310/90, 91, 254; 74/572, 573 R, 574

[56]    References Cited

U.S. PATENT DOCUMENTS

| | | |
|---|---|---|
| 4,731,554 | 3/1988 | Hall et al. ............................. 310/67 R |
| 5,001,172 | 3/1991 | Tsuchiya et al. ...................... 523/220 |
| 5,006,765 | 4/1991 | Schmider ................................ 310/71 |
| 5,030,863 | 7/1991 | Yoshimura et al. ..................... 310/52 |
| 5,042,616 | 8/1991 | McHugh ............................... 184/6.11 |
| 5,065,060 | 11/1991 | Takahashi et al. ....................... 310/74 |
| 5,124,605 | 6/1992 | Bitterly et al. ........................... 310/74 |
| 5,149,067 | 9/1992 | Fruhauf et al. ..................... 267/140.13 |
| 5,442,250 | 8/1995 | Stridsberg ............................... 310/186 |
| 5,480,361 | 1/1996 | Murakami et al. ..................... 475/328 |
| 5,614,777 | 3/1997 | Bitterly et al. ........................... 310/74 |

*Primary Examiner*—Thomas M. Dougherty
*Assistant Examiner*—Tran N Nguyen
*Attorney, Agent, or Firm*—Morrison Law Firm

[57]    ABSTRACT

A flywheel-type power storage device comprises a coreless synchronous and outer rotor-type motor and a flywheel. The motor comprises a stator provided with a stator winding having a cylindrical portion, and a rotor having inner and outer field members constituting therebetween a field gap in which the cylindrical portion is positioned. At least one of the inner and outer field members comprises a permanent magnet. A bearing is provided between the stator and the rotor so as to rotatably support the rotor against said stator. The stator is separated into a bearing portion constituting the bearing and a stator body provided with the stator winding. The bearing portion is supported via an elastic member by the stator body. The flywheel is fixed on the outer side of the outer field member.

23 Claims, 8 Drawing Sheets

FLYWHEEL-TYPE POWER STORAGE DEVICE

This application is a continuation-in-part of application Ser. No. 08/389,172, filed on Feb. 15, 1995, now abandoned.

BACKGROUND OF THE INVENTION

1. Field of the Invention

This invention relates to a flywheel-type power storage device which stores electrical energy by converting the electrical energy to flywheel rotation energy. This device is useful for backing up the important power sources provided for emergencies and is also useful in combination with power generation by sunlight, wind force, wave force or the like to level the output electric power thereof.

2. Prior Art

There has heretofore been known an electrical energy storage device provided with a rotary electrical machine (or motor/generator) and a flywheel fixed to the rotor of the machine. The rotary electrical machine which has been used in the conventional flywheel-type power storage device, however, is not suitable for use for power storage due to its energy loss.

For example, Takahashi et al. (U.S. Pat. No. 5,065,060) disclose a flywheel type energy storage device comprising an induction motor and a flywheel. It is well known to one skilled in the art that the power loss of an induction motor is larger than a dc or synchronous motor having a similar dimension thereto. More specifically, in Takahashi's device, inductive loss (or iron loss) incurs in the rotor upon accumulation (or charge) and release (or discharge) of electric power although it does not incur because of the absence of excitation upon racing of the motor after accumulating the electric power. Since a high efficiency flywheel is placed in a vacuum or in vacuo to prevent the flywheel from causing its energy loss due to friction between it and the air, the motor assembled in one body with the flywheel is also placed in the vacuum and it is very difficult to sink or remove heat generated in the rotor. Accordingly, it is difficult to make such a device with a large capacity and, therefore, such a device is limitedly used for a relatively small capacity one such as UPS.

Hall et al. (U.S. Pat. No. 4,713,554) disclose a low profile ring-shaped motor comprising a stator having a winding with a core and a rotor having inner and outer field members constituting therebetween a field gap in which the winding wound on the core is positioned. One of the motor disclosed by Hall et al. is a dc/synchronous one whose field members comprise permanent magnets. It is considered to use a dc/synchronous motor disclosed by Hall et al. instead of the induction motor of the flywheel type energy storage apparatus disclosed by Takahashi et al. in order to reduce the motor loss. Then, there is raised a problem as to bearings being great in power loss.

In such a device which uses a motor, a ball-and-roller bearing and a magnetic bearing are used as a bearing to bear the rotation axis of the rotor. Such a device in which a magnetic bearing is used, is disclosed in, for example, "27th Intersociety Energy Conversion Engineering Conference '92, Design and Manufacturing for a Composite Multi-Ring Flywheel" and French Patent No. 4,731,554 (Pierre).

The above bearings and the like will not be suitable for high-speed rotation as far as the conventional synchronous motor provided with winding having a core and a field member comprising a permanent magnet is used. More particularly, the deviation of rotation axis of the rotor causes unbalance of magnetic attraction exerted on the core of the winding of the rotor whereby the deviation of the rotor is further expanded, this being a vicious cycle. It thus becomes necessary to rigidly support the rotor very securely in order to prevent the rotor from being deviated thereby to suppress said vicious cycle, but this necessity is very technically difficult to realize, will cause the device to be complicated in structure and will incur a great power loss. Accordingly, the motor having the core therein comes to have a low limit on the rotation velocity allowable for such a motor whereby the motor is unsuitable for efficient storage of electrical power.

In addition, a dc/synchronous motor with core is unsuitable for a power storage device because it has a demerit that it generates iron loss even when it races after accumulation of power and continuously spends the accumulated or stored power, that is, it is low in power storing efficiency.

The magnetic bearing disclosed by Pierre (French Patent No. 4,731,554) achieves an electric servo control with intent to suppress said vicious cycle and, therefore, there will incur a great power loss caused by an electrical power for the servo control. Pierre further discloses a structure of coreless and brushless-type dc/synchronous motor using an inverter to generate a rotating magnetic field and employing a method wherein non-magnetic members are arranged between multipolar magnets to avoid generation of torque in the reverse direction to rotation direction, which will be generated in a conventional brushless-type motor. In Pierre's motor, however, since electro-magnetic power is not generated in wires near the non-magnetic members, the normal torque is reduced as far as the reverse torque is reduced.

SUMMARY OF THE INVENTION

The main object of this invention is to provide a novel flywheel-type power storage device which is more efficient and allows the flywheel to be easily disposed in a vacuum, in view of the prior art technical problems mentioned above.

The above object may be achieved by providing a novel flywheel-type power storage device which comprises a rotary electrical machine provided with a stator having a stator frame and a coreless-type winding fixed thereto and an outer rotor-type rotor having a permanent magnet, a bearing means for elastically, and pivotally or rotatably, supporting the rotor against the stator, and a flywheel fixed on the outer side of the rotor. More specifically, the stator winding including a cylindrical portion, the rotor has inner and outer field members having a field gap therebetween, the cylindrical portion is positioned in the field gap, the flywheel fixed on the outer side of the outer field member, and the bearing means comprising a bearing housing which is supported via an elastic member by the stator frame.

The wire portions positioned in the cylindrical portion of the stator winding are each disposed in parallel with the cylinder axis of the cylindrical portion (or rotation axis of the rotor). In addition, the flywheel is made of a carbon fiber-reinforced plastic in which the carbon fibers are disposed circumferentially of the flywheel and have higher elastic moduli/density in the increasing order in the radial direction from the inner portion of the flywheel to the outer portion thereof. It is desirable that the bearing means have a means to bear the rotor in the thrust direction so as to maintain the rotor position in the thrust direction at a predetermined equilibrium position. The whole storage device is usually disposed in a vacuum container.

In this composition, when electrical power is supplied to the coreless-type rotary electrical machine, the power is converted to dynamic or mechanical energy by said electrical machine and then accumulated as rotation energy of a flywheel. At this point, the conversion and accumulation of the energy is highly efficiently effected since the stator winding of the machine has no core and the density of magnetic flux in the field members does not change thereby to incur none of energy losses which are otherwise caused due to core loss or iron loss. The energy so accumulated can be converted to electrical power with the same high efficiency as above. In contrast, in a case where the stator winding of a rotary electrical machine has a core, the electrical machine will incur a loss of 3–4% due to the core loss even if the machine has high performances.

Further, according to this invention, the stator winding makes no magnetic attraction between it and the field members since it has no core. Accordingly, there will be avoided the enlargement of rotor deviation caused when the winding has a core, by the magnetic attraction made between the stator winding and the field members and it will not be necessary to rigidly support the rotation axis securely since the rotation balance is not lost even if the rotation axis of the rotor deviates, whereby avoiding a mechanical power loss caused by rigidly and securely supporting a rotor and the conventional bearing techniques are allowed to fully cope with such deviations. Furthermore, it is made possible to support the bearing means of the stator via an elastic member since said rigid supporting comes to be unnecessary. This is very advantageously serviceable for simplifying the structure of a storage device of this invention, avoiding the resonance frequency and particularly enhancing acceptable or the maximum rotation velocity.

The coreless-type rotary electrical machine according to this invention which is a so-called outer rotor-type one can very easily be disposed in the central portion of the flywheel since the flywheel is designed to be fixed on the outer side of the outer field member constituting the rotor. Thus, the storage device can be constructed in a very compact size and can wholly be easily disposed in a vacuum; the connections of the device to the outside comprise only fixed ones such as cables for receiving and supplying electrical power, thereby to avoid a problem as to the sealing of the high-speed rotation axis which conventionally connects the flywheel to the rotary electrical machine.

In a case where wire portions of the cylindrical portion of the stator winding are each disposed around the cylinder axis in parallel therewith to allow the current to flow perpendicularly to the magnetic field, whereby the energy loss of the rotary electrical machine will be greatly reduced (to between about one-fourth and about one-seventh of the energy loss of the conventional one wherein skew winding around the cylinder axis is adopted).

Briefly stated, a flywheel-type power storage device comprises a coreless synchronous and outer-rotor type motor and a flywheel. The motor comprises a stator provided with a stator winding having a cylindrical portion, and a rotor having inner and outer field members constituting therebetween a field gap in which the cylindrical portion is positioned. At least one of the inner and outer field members comprises a permanent magnet. A bearing is provided between the stator and the rotor so as to rotatably support the rotor against the stator. The stator is separated into a bearing portion constituting the bearing and a stator body provided with the stator winding. The bearing portion is supported via an elastic member by the stator body. The flywheel is fixed on the outer side of the outer field member.

According to one embodiment of the present invention, a flywheel-type power storage device comprises a coreless-type rotary electrical machine which comprises a stator provided with a stator winding having a cylindrical portion, and a rotor having inner and outer field members constituting therebetween a field gap in which the cylindrical portion is positioned, wherein at least one of the inner and outer field members comprises a permanent magnet, a bearing means provided between the stator and rotor so as to rotatably support the rotor against the stator, the stator being separated into a bearing portion constituting the bearing means and a stator body provided with the stator winding, the bearing portion being supported via an elastic member by the stator body, and a flywheel positioned outside the outer field member.

According to another embodiment of the present invention, a flywheel-type power storage device comprises a coreless-type rotary electrical machine which comprises a stator provided with a plurality of three-phase windings, the three-phase windings being isolated from each other and having a cylindrical portion, and a rotor having inner and outer field members constituting therebetween a field gap in which the cylindrical portion is positioned, wire portions in the cylindrical portion being each disposed in parallel with the rotation axis of the rotor, wherein at least one of the inner and outer field members comprises a permanent magnet, a bearing means provided between the stator and rotor so as to rotatably support the rotor against the stator, the stator being separated into a bearing portion constituting the bearing means and a stator body provided with the stator winding, the bearing portion being supported via an elastic member by the stator body, and a flywheel positioned outside the outer field member.

According to another embodiment of the present invention, a flywheel-type power storage device comprises a stator provided with a plurality of three-phase windings, the three-phase windings being isolated from each other and having a cylindrical portion, a rotor having inner and outer field members constituting therebetween a field gap in which the cylindrical portion is positioned, wire portions in the cylindrical portion being each disposed in parallel with the rotation axis of the rotor, wherein at least one of the inner and outer field members comprises a permanent magnet, and a bearing means provided between the stator and rotor so as to rotatably support the rotor against the stator, the stator being separated into a bearing portion constituting the bearing means and a stator body provided with the stator winding, the bearing portion being supported via an elastic member by the stator body.

The above, and other objects, features and advantages of the present invention will become apparent from the following description read in conjunction with the accompanying drawings, in which like reference numerals designate the same elements.

DESCRIPTION OF THE PREFERRED EMBODIMENT

This invention will be better understood by the following Example.

EXAMPLE

Figure 1:
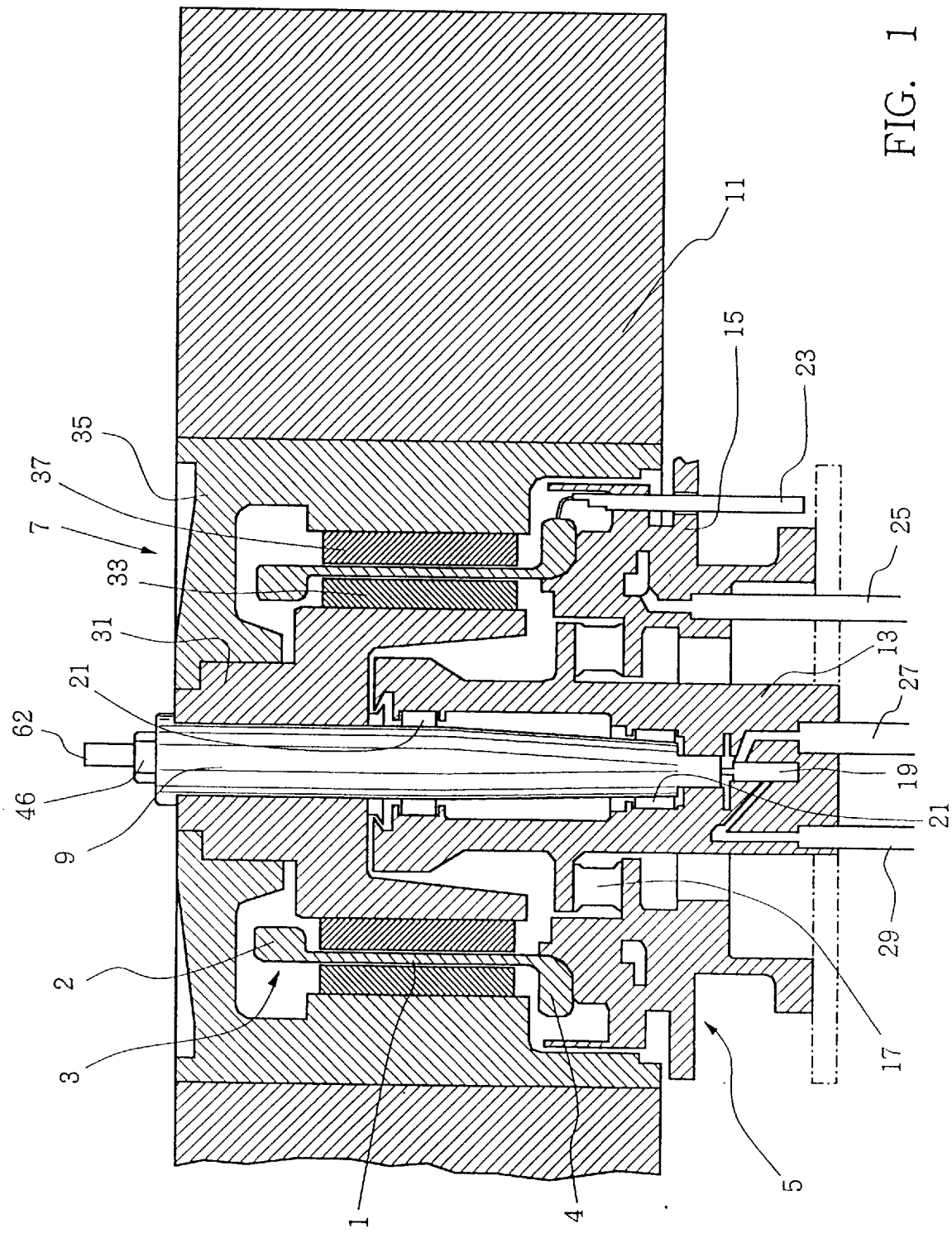
FIG. 1 is a cross-section of one embodiment of a flywheel-type power storage device of this invention.

FIG. 1 is a sectional view of one embodiment of a flywheel-type power storage device of this invention. As is shown in this Figure, the device comprises (1) a coreless-type rotary electrical machine having a stator 5 provided with stator winding 3 having a cylindrical portion 1 thereof and a rotor 7 provided with field members for generating a rotary field in which the cylindrical winding portion 1 is positioned, (2) a bearing means disposed between the stator 5 and the rotor 7 to rotatably support a rotation axis 9 provided in the rotor 7 and (3) a flywheel 11 fixed to the outside of an outer one of said field members.

The stator 5 comprises a stator frame 15 provided with the stator winding 3. The bearing means comprising a bearing house supported via a vibration-proof rubber 17 by the stator frame 15. In the cylindrical winding portion 1 of the stator winding 3, the wire portions of the winding 3 are each disposed in parallel with the axis of the cylinder.

Figure 7:
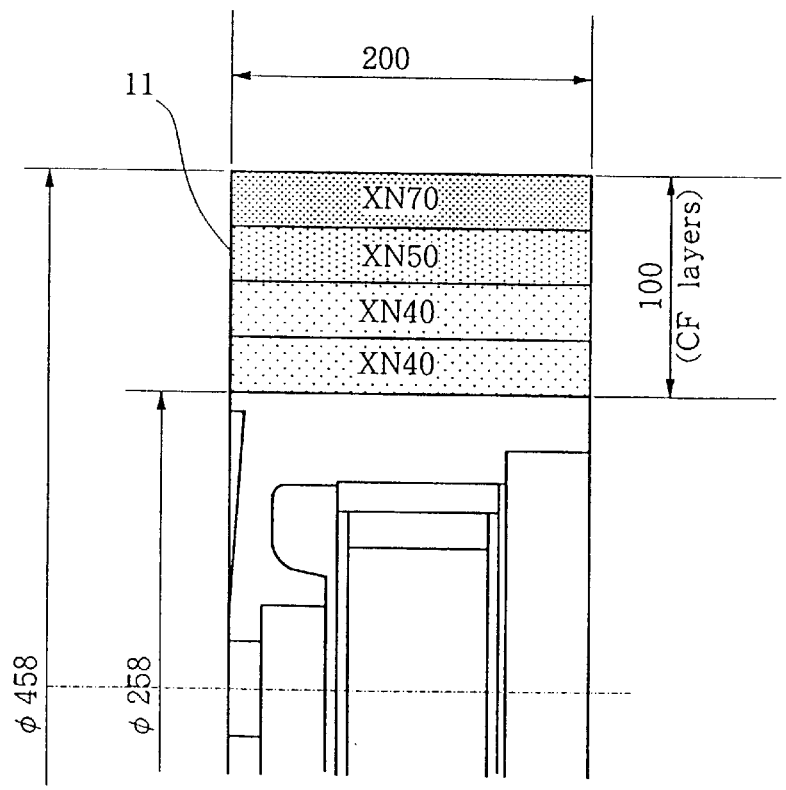
FIG. 7 is a view showing the structure of a flywheel of the device indicated in FIG. 1.

The flywheel 11 is preferably small-sized, light in weight and as great as possible in energy obtained by the rotation thereof. The energy so obtained depends for its greatness upon the weight, shape and rotation velocity of the flywheel, and it depends particularly upon the rotation velocity of the flywheel and is proportional to the square thereof. It is therefore intended herein to increase the rotation velocity as high as possible in order to enhance energy efficiency. Thus, it is preferred that the material for the flywheel 11 be light in weight and high in strength. Carbon fiber-reinforced plastics may be used herein as said material. From this standpoint, there may be used other plastics reinforced with glass fibers, aramid fibers or the like. Flywheels formed by a filament winding method in such a manner that the reinforcing fibers are disposed in agreement with the circumferential direction of the flywheel, have very high strength in their circumferential direction, while they are not so expected to have satisfactory strength but their stress in the radial direction during the rotation thereof can be lessened if their material constitution is such that "elastic modulus/density" of the fiber-reinforced plastics increases towards the outside in the radial direction and in proportion to the 3.3th power of the radius ((length of the radius)$^{3.3}$). Because of this, the carbon fibers for example are disposed in the circumferential direction of the flywheel and the carbon fibers used herein are increasingly high in elastic modulus from the inside to the outside of the flywheel in the radial direction as illustrated in FIG. 7.

The bearing means has a spool 19 which bears the rotation axis 9 in the thrust direction so that the thrust direction position of the rotation axis 9 is maintained at a predetermined equilibrium position by means of oil pressure control. The rotation axis 9 is borne in the radial direction by a superhigh-speed needle gauge 21.

The device of this invention is wholly housed in a vacuum container. To the outside of the vacuum container are extended a cable connected to a terminal 23 for supplying and receiving electrical power, a pipe 25 for passing cooling water therethrough, and pipes 27 and 29 respectively for passing a high-pressure oil and low pressure oil for controlling a spool 19. An extension is connected at a terminal 23 to a lead coming from the stator winding, and the connection can be effected by soldering, welding, caulking, screwing or the like.

The field members forming a field gap therebetween in which the cylindrical portion 1 is positioned, comprise an inner yoke 31 fixed to the rotation axis 9, an inner magnet 33 fixed to the inner yoke 31 and facing the cylindrical portion 1 from the inside thereof, an outer yoke 35 fixed to the inner yoke 31, and an outer magnet 37 fixed to the outer yoke 35 and facing the cylindrical portion 1 from the outside thereof. The inner and outer yokes 31 and 35 have high magnetic conductivity and are made of a high-strength magnetic material. Further, the inner magnet 33 may be made of a ferromagnetic material.

The stator winding 3 may be three-phase Y-type winding or the like, and wire portions in the cylindrical portion 1 are each disposed in parallel with the cylinder axis of the cylindrical portion. The wire portions are connected together at terminals 2 and 4.

A sensor for detecting the position of the rotor 7 may be provided between the rotor 7 and the stator 5, for example at a convenient position between the rotation axis 9 or the inner yoke 31 of the rotor 7 and the bearing housing 13.

The coreless-type rotary electrical machine having such constitution as above according to this invention has almost the same structure as that described in Japanese patent application No. Hei 4-238841 (No. 238841/92) the present inventors previously filed. More particularly, the constitution is such that the stator winding 3 is wound in parallel with the rotation axis at the cylindrical portion 1 situated between the field members, a crossover track to the next winding position is thus formed at the terminals 2 and 4, and the terminal 2 is allowed to be larger in size than the field gap. After the stator winding 3 is provided at the outer yoke 35 to which the outer magnet 37 is fixed, the inner yoke 31 having the inner magnet 33 fixed thereto is fixed for fabrication of the rotary electrical machine. In the conventional coreless-type rotary electrical machine, skew winding which needs no crossover tracks has been adopted as winding so as to enable the winding to be inserted into a previously prepared field gap for fabrication of the machine; thus, each of the wire portions of the winding obliquely crosses the magnetic field formed by the field members. In contrast, in the coreless-type rotary electrical machine according to, this invention, the crossover portion is provided at the terminals and the wire portions of the winding are each disposed in parallel with the rotation axis thereby to allow each of said wire portions to perpendicularly cross the magnetic field, resulting in considerable enhancement of the efficiency of the machine as compared with the conventional one.

Figure 2:
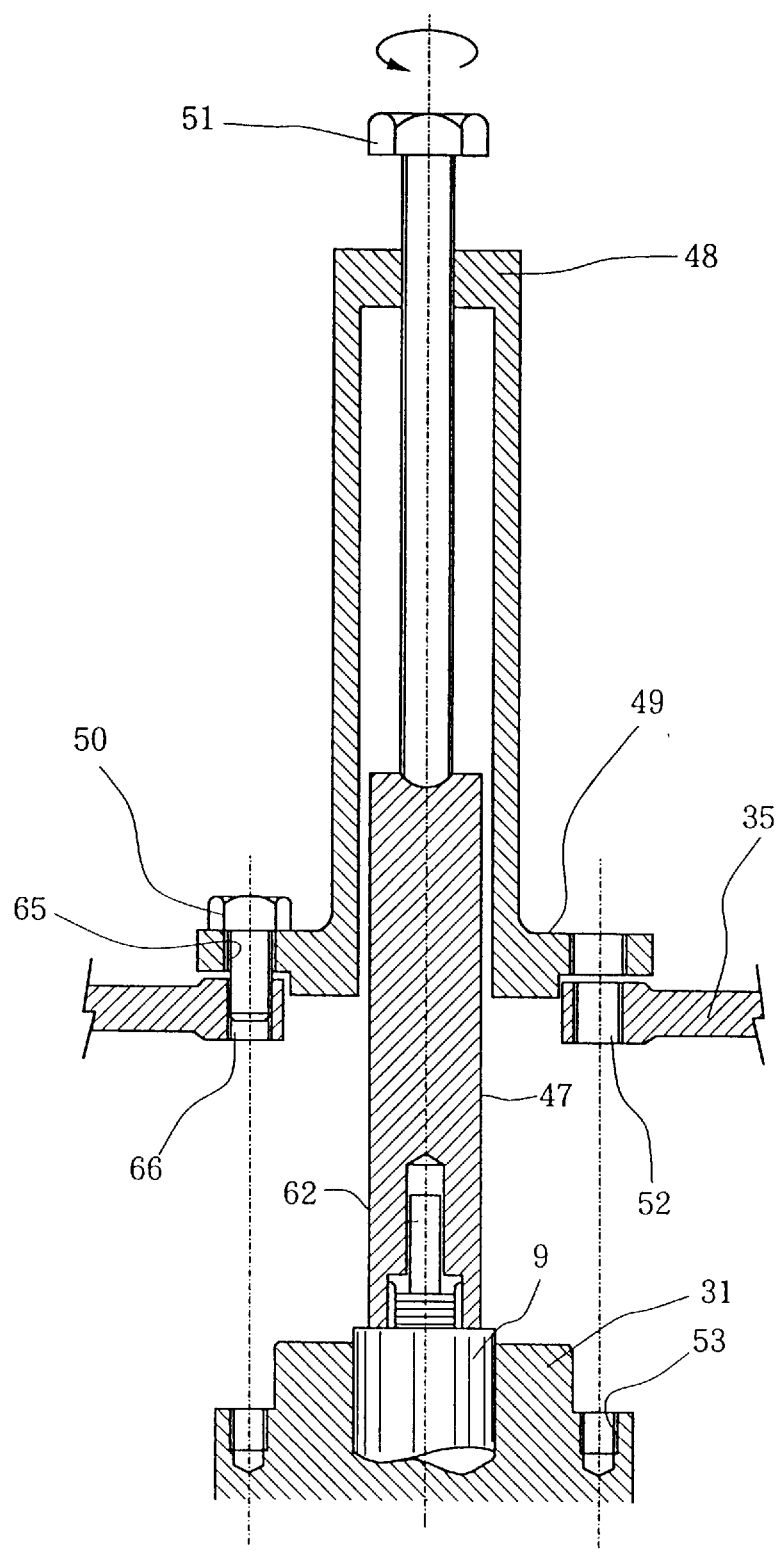
FIG. 2 shows how to assemble an inner yoke and an outer yoke.

FIG. 2 shows a method for assembling the inner yoke 31 and the outer yoke 35. This assembly is effected as follows.

First of all, a nut 46 at the top of the rotation axis 9 shown in FIG. 1 is disengaged while the bearing housing 13 provided with the rotation axis 9 and the stator 5 is fixed to the floor of a vacuum container or a platform for use in assembly, after which a guide rod 47, instead of the nut 46, is so manipulated that a pin 62 ( for use in centering) is positioned within the guide rod 47 to engage both of them with each other by screwing. On the other hand, the outer yoke 35 is screwed by a bolt 50 as if it were suspended from the under side of a flange 49 of an outer cylinder 48 and, thereafter, a long-sized bolt 51 for jacking is screwed deep into the outer cylinder 48. The flange 49 of the outer cylinder 48 has provided with a hole 65 for screwing the outer yoke 35 and openings (not shown) for facilitating the screwing of the outer yoke 35 to the inner yoke 31. Further, the outer yoke 35 is provided with a threaded hole 66 for screwing said yoke 35 to the flange 49. Then, the outer cylinder 48 is manipulated so that the guide rod 47 is positioned within the outer cylinder 48. At this point, the long-sized bolt 51 contacts the top end of the guide rod 47 and, therefore, the magnet 37 on the outer yoke 35 does not reach the top position of the magnet 33 or magnetic path (yoke) of the inner yoke 31. Thereafter, the long-sized bolt 51 is returned upward whereby the outer yoke 35 is made to descend and the magnets 37 and 33 begin to overlap each other to exert a strong force in the radial direction (lateral direction). The outer yoke 35, however, still descends with aid of guiding action of the guide rod 47 without contact with the winding 3 and the like. When the outer yoke 35 descends to the position indicated in FIG. 1, openings 52 of the outer yoke 35 and threaded holes 53 of the inner yoke 31 are overlapped each other to be screwed together with screws for fabrication or assembly. Then, the bolt 50 connecting the outer yoke 35 to the flange 49 is disengaged, the outer cylinder is removed, and the guide rod 47 is disengaged.

The inner yoke 31 and the outer yoke 35 are assembled together in accordance with the above procedures. If the guide rod 47 and the outer cylinder 48 are high in accuracy, the eccentricity between the yokes 31 and 35 will be lessened and the force in the radial direction is minimized, thereby to facilitate the assembly of the yokes. The disassembly of the yokes is effected in the order reverse to the above assembly order. The threaded hole 66 made in the outer yoke 35 to screw the yoke 35 to the flange 49 with the bolt 50 is provided separately from the fixing hole 52 and, however, the hole 52 may be used instead of the threaded hole 66 if threaded.

Figure 3:
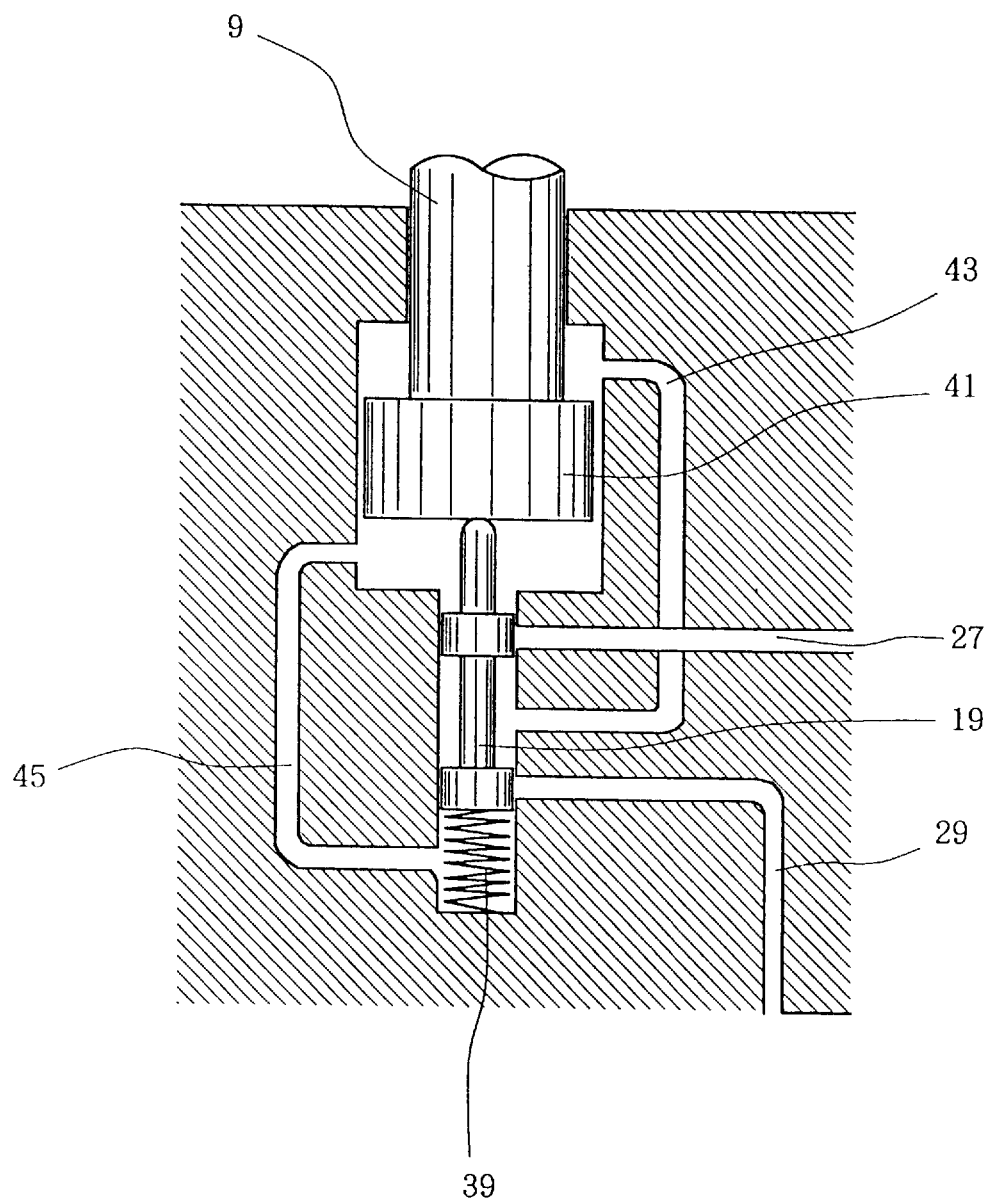
FIG. 3 is a cross-sectional view showing the particulars of a spool portion of the device indicated in FIG. 1.

FIG. 3 is a cross-sectional view showing the particulars of a portion of the present device, the portion including a spool 19. With reference to this Figure, when the rotation axis 9 descends beyond the equilibrium position (assuming that the Figure shows the rotation axis 9 to be at the equilibrium position), the spool also descends against a spring 39 whereby a high-pressure oil is supplied to beneath a piston 41 situated Just under the lower end of the rotation axis 9 to exert an upward force on the bottom of the piston 41. At this point, the oil present above the piston 41 is returned via pipes 43 and 29 to a drain tank thereby to push the rotation axis 9 upward as far as it reaches the equilibrium position. Reversely, when the rotation axis 9 ascends beyond the equilibrium position, the high-pressure oil is supplied to above the piston 41 via pipes 27 and 43 while the oil present under the piston 41 is drained via pipes 45 and 29, whereby the rotation axis 9 is pushed down as far as it reaches the equilibrium position. In this manner, the rotation axis 9 is designed to be maintained at the equilibrium position.

Figure 4:
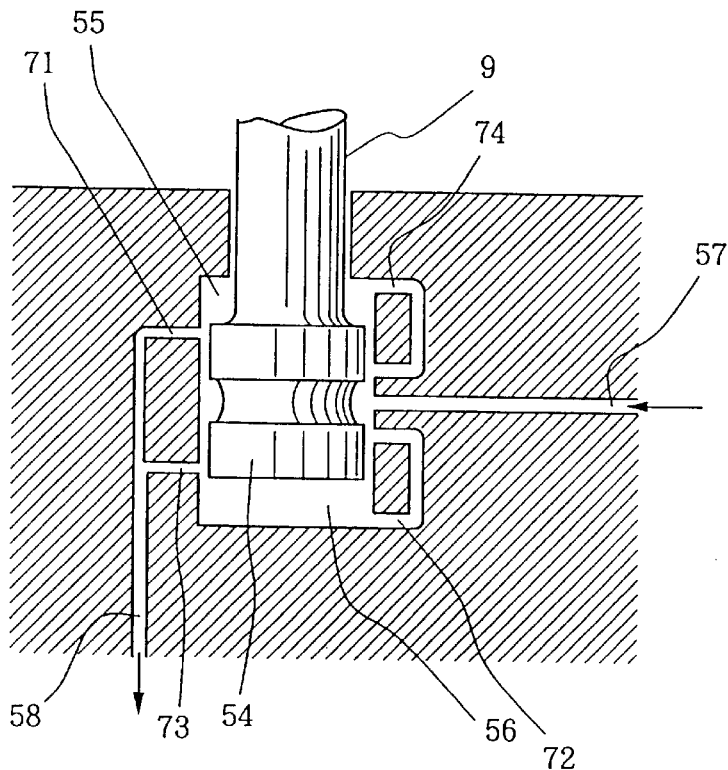
FIGS. 4–6 are other embodiments of a spool portion of the device indicated in FIG. 1, respectively.
Figure 5:
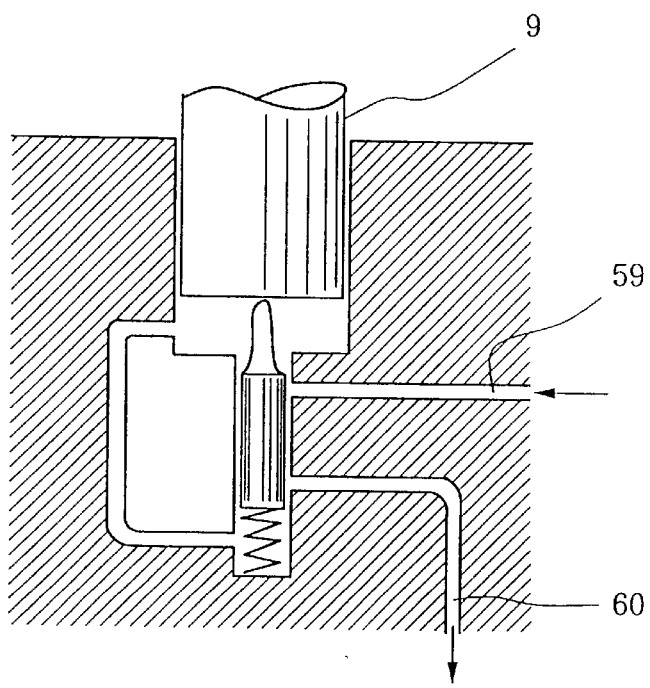
Figure 6:
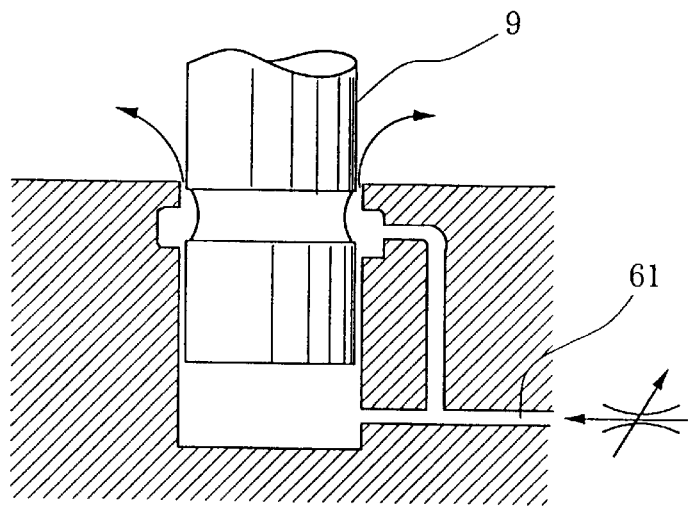

FIGS. 4–6 are other embodiments of a bearing portion for bearing the rotation axis in the thrust direction, respectively. In the bearing portion of FIG. 4, when a piston 54 descends, an upper room 55 opens at its drain port 71 to drain an oil through a pipe 58, while a high-pressure oil enters a lower room 56 via a pipe 57 through a pressure port 72 thereby enabling a piston 54 to ascend. When the piston 54 ascends too far, the lower room 56 opens at its drain port 73 while a high-pressure oil enters the upper room 55 from the pressure port 74 thereby to allow the piston 54 to descend. This operation is free from hunting under wider condition of the mass of rotor assembly, the viscosity of the oil used, and the like. This operational system is called "one body-type dual-acting" one and is based on the same acting principle as spool-type dual action.

Each of FIGS. 5–6 illustrates a bearing system for a large-sized stationary device in which minus G (force in the ascending direction) is not considered. Briefly stated, all an axial bearing has to do is only to bear a downward force. In the bearing system of FIG. 5, a high-pressure oil is supplied through a pipe 59 and then drained through a pipe 60. This is single action, but is the same in acting principle as the bearing system of FIG. 3. In the bearing system, when the amount of a high-pressure oil supplied through a pipe 61 is set at a certain fixed value which is regulated or controlled by means of a variable orifice or a variable output pump, the rotation axis 9 will stop at such a position (height) that the amount of the oil supplied and the amount thereof drained are balanced with each other.

The oil for use in "roller bearing" or "hydraulic axial thrust supporting device" which is used as a bearing means under a vacuum, is preferably a low vapor pressure oil (an oil for vacuum pumps) such as Fairback Gold (tradename) produced by Nippon Oil Co., Ltd.

FIG. 7 is a schematic view showing the structure of a flywheel 11. As indicated in the Figure, the flywheel is constructed so that it gradually increases in elastic modulus radially from the inner side to the outer side thereof. For example, the innermost two layers are made of a carbon fiber-reinforced plastic in which the carbon fibers are commercially available ones supplied under tradename of XN40 by Nippon Oil Co., Ltd., the third layer is made of such a plastic in which the carbon fibers are XN50 in tradename and the outermost layer is made of such a plastic in which the carbon fibers are XN70 in tradename.

The flywheel made of the plastics and having the size as indicated in FIG. 7 was tested for its performances with the result that it exhibited a maximum of 35,600 r.p.m. and a storage energy density of 67 Wh/kg.

Figure 8:
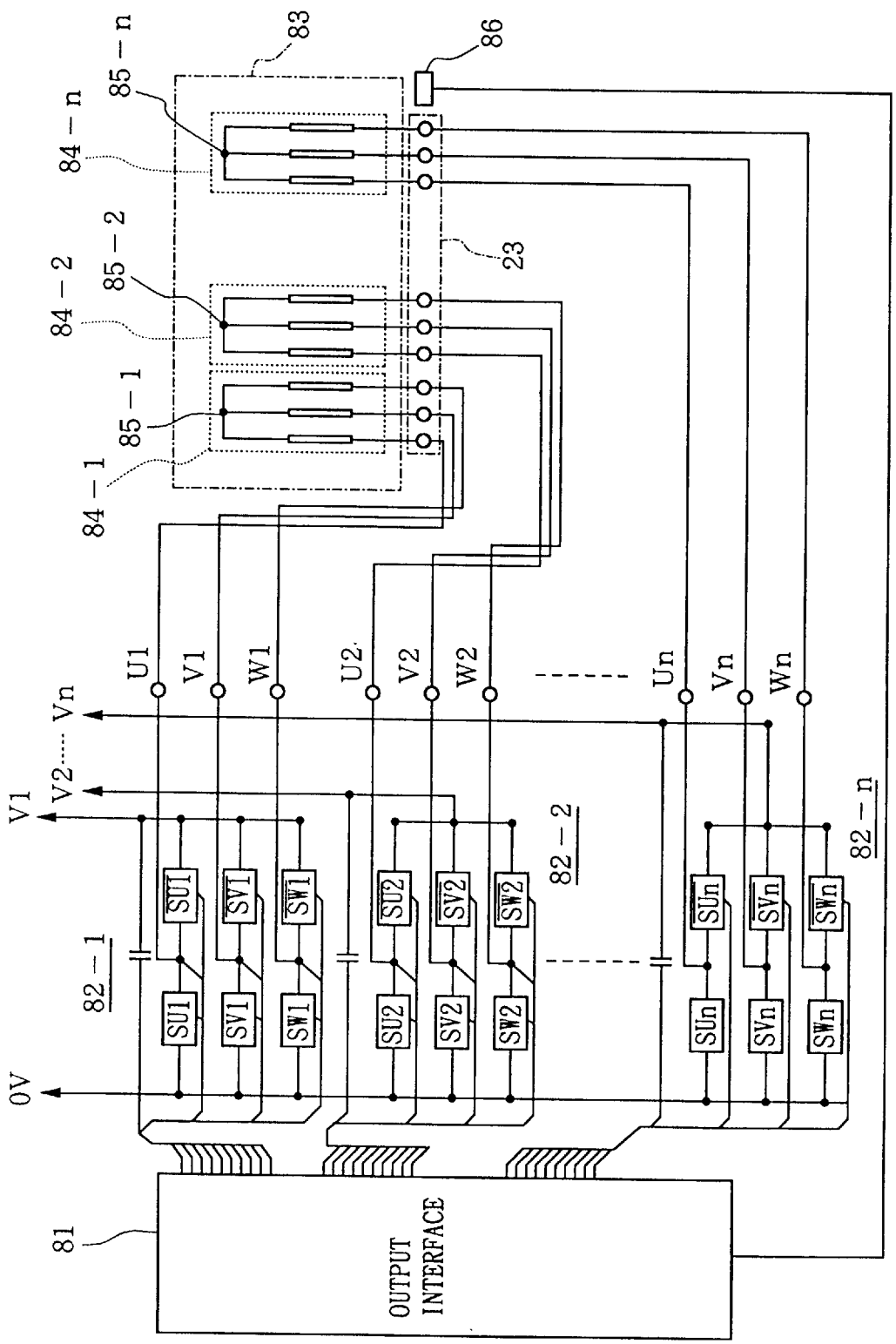
FIG. 8 is a circuit diagram of one embodiment of a power storage device of this invention; for explaining the structure of the stator winding
Figure 9:
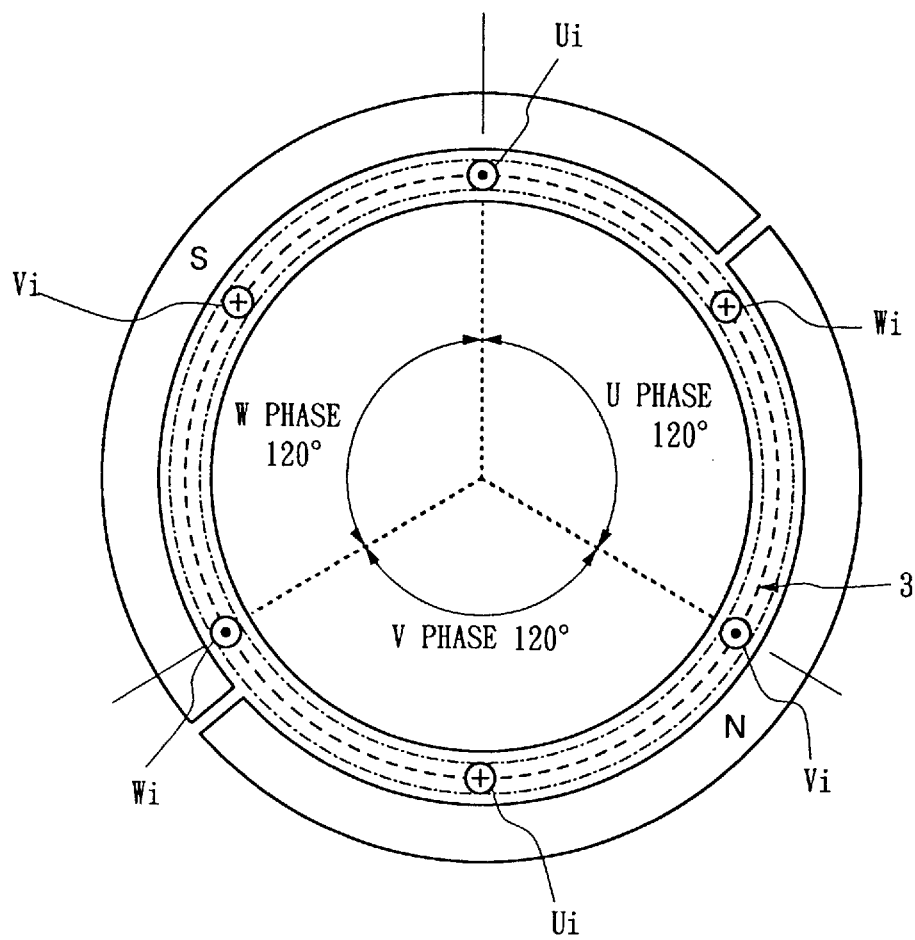
FIG. 9 is a schematic cross-sectional view of the cylindrical portion showing one three-phase winding of the device indicated in FIG. 1.

FIG. 8 is a circuit diagram of one embodiment of a power storage device of this invention. This circuit comprises an output interface circuit 81, three-phase inverters 82-1, 82-2, . . . and 82-n and a rotary electrical machine 83 with a flywheel. The rotary electrical machine 83 with flyweel may be one, for example, shown in FIG. 1. A stator winding 3 of the machine 83 comprises n of three-phase windings 84-1, 84-2 . . . and 84-n and each 81-i of the three-phase windings comprises three winding wires Ui, Vi and Wi (i=1, 2, . . . , n). The winding wire Ui starts from terminal 23, goes through the crossover track 4 (FIG. 1), goes up to the crossover track 2 (FIG. 1) parallely to the rotation axis as shown in FIG. 9, goes through the crossover track 2 around the axis about 180°, goes down to the crossover track 4 and connecting with the other winding wire Vi and Wi of the three-phase windings 84-i in the crossover track 4 to form a neutral point 85-i of a star connection tree-phase winding 84-i. Note that the neutral points 85-1, 85-2, . . . and 85-n are electrically isolated from each other. The machine 83 is provided with a position sensor 86 for detecting the rotation position (angle) of the rotor 7 (FIG. 1).

Figure 10:
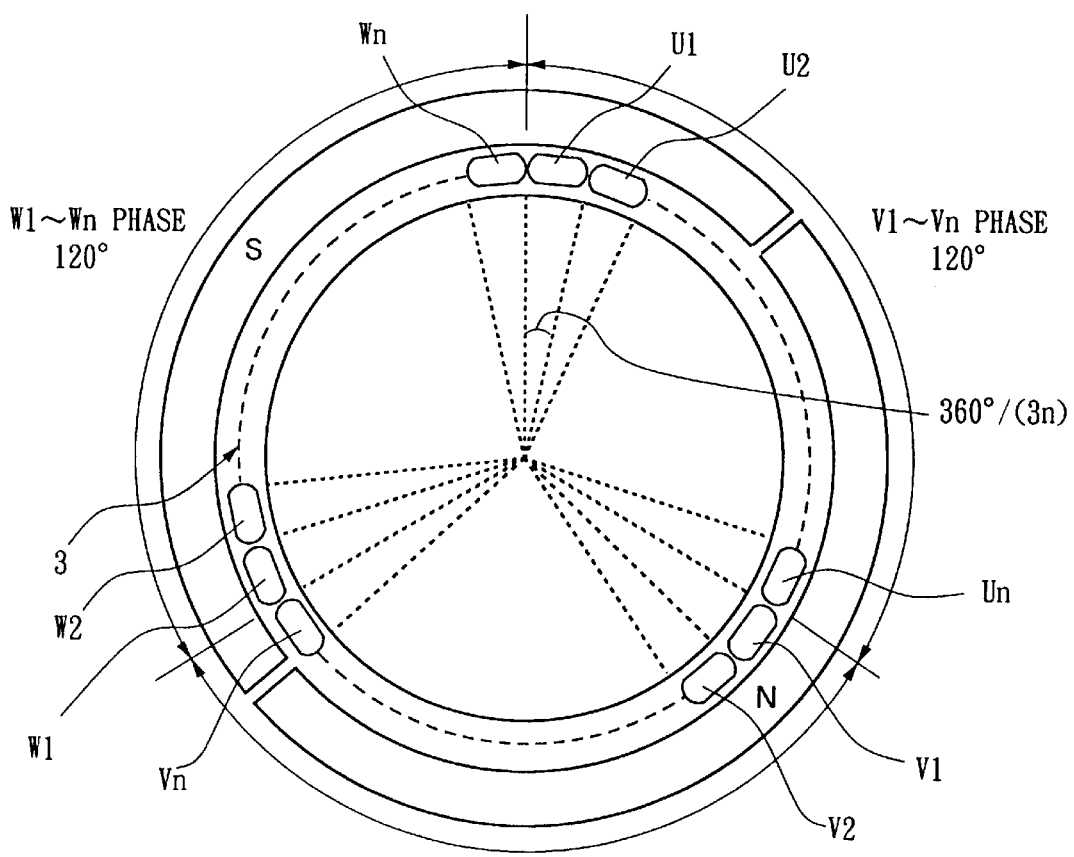
FIG. 10 is a schematic cross-sectional view of the cylindrical portion showing the arrangement of n three-phase windings of the device indicated in FIG. 1.
Figure 11:
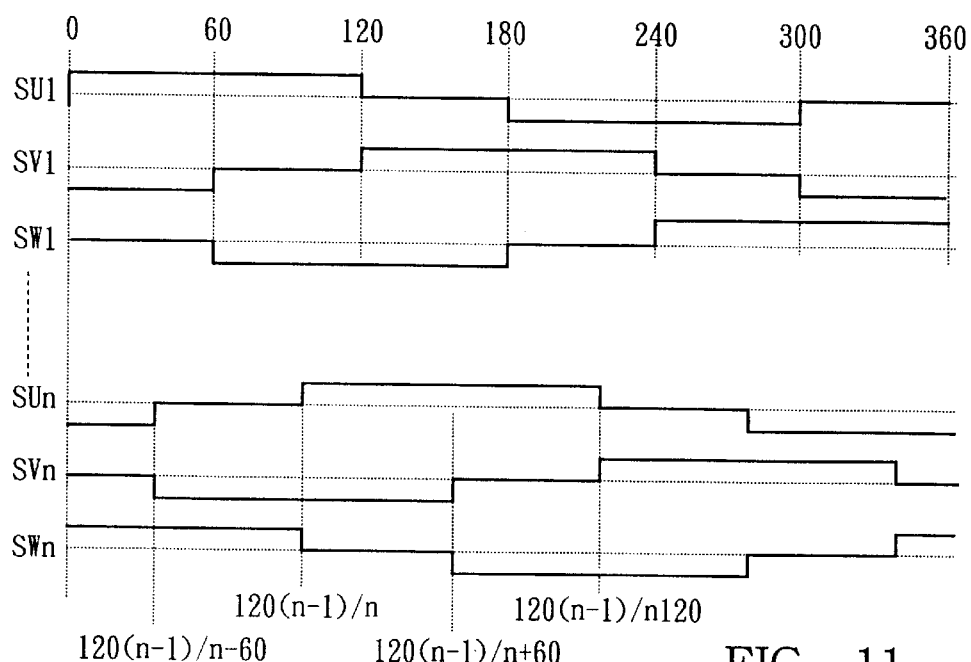
FIG. 11 shows ON/OFF switching waveforms of inverters indicated in FIG. 8.

FIGS. 9 and 10 show a construction of the stator winding of a two pole rotary electrical machine. FIG. 11 shows waveforms of the outputs from the output interface circuit 81 to the three-phase inverters 82-1, 82-2, . . . and 82-n. Each inverter 82-i (i=1, 2, ..., n) for driving the stator winding 84-i comprises six semiconductor switching devices SUi, SUi, SVi, SVi, SWi and SWi. As shown in FIG. 11, the output interface circuit 81 for driving the inverters 82-1, 82-2 ... and 82-n generates the three-phase square-wave ac voltages so that a phase delay between output voltages to be applied to first three-phase winding 84-1 and i-th three-phase winding 84-1 is 120° (i-1)/n.

In the motor according to this invention, a plurality of three-phase windings whose phases are successively shifted are arranged and a control means which applies a necessary current to each of the windings at a necessary timing is used. By increasing the number of the three-phase windings, an electric angle of each the three-phase windings can be made smaller. According to this invention, the problem of Pierre's motor that a reverse torque incurs when a winding crosses a boundary of magnetic fields can be solved without arranging a non-magnetic member at the boundary. In the motor according to this invention, the reverse torque can be made almost zero by selecting the number of the three-phase windings because there appears at magetic polar changing point a portion where the density of magnetic flux is lowered, and the direction of the current flowing through the windings can be changed at that portion.

The motor according to this invention is very high in the efficiency and can be preferably used in an electric vehicle such as automobile or power assist-type bicycle. The flywheel-type power storage device can also be used for leveling the output of a combustion engine to make the exhaust gas thereof of a combustion engine/rotary electrical machine hybrid-type vehicle clean.

(Effect of the invention)

As so far mentioned, this invention enables energy loss due to core loss to be avoided and also enables the conversion, accumulation and release of energy to be efficiently effected. Accordingly, since the rotor temperature can be prevented from rising, a larger capacity of charge and discharge by placing a flywheel with a rotary electrical machine in a vacuum can be realized. Further, this invention makes it possible to avoid an increase in deviation of the rotor, which otherwise occurs when the winding has a core, due to magnetic attraction between the field members and the core. Accordingly, it is made unnecessary to rigidly support the rotation axis, and the bearing loss can be lessened and the conventional bearing technique is enabled to satisfactorily cope with problems as to said support. Further, since it is unnecessary to rigidly support the rotation axis, the bearing means can be supported via an elastic member with respect to the stator frame whereby the device can be constructed simply and the maximum rotation velocity (r.p.m.) can be widely enhanced. Furthermore, the rotary electrical machine can very easily be disposed in the central portion of the flywheel thereby to make the device very compact and easily dispose the whole of the device in a vacuum. At this point, connections from the device to the outside are satisfied with only fixed ones such as cables for supplying or receiving electrical power, and there are avoided problems as to the sealing of the high-speed rotation axis which connects the flywheel to the rotary electrical machine. Still further, the efficiency of the rotary electrical machine can be enhanced almost unlimitedly as high as that of conventional one by disposing each of the wire portions in the cylindrical portion of the stator winding in parallel with the cylinder axis.

The flywheel and rotor are caused to rotate in a higher rotation number (or velocity) to enhance energy density, and elastically deformed by centrifugal force when accumulating energy or power. The deformation is not limited to a concentric one. Accordingly, unbalance against the axis will occur and grow. If the axis is supported rigidly by a bearing, a vibration load is effected on the bearing, which will break finally. This breaking point of the bearing determines the upper limit of the rotation number of the flywheel. This is the reason why the upper limit of the rotation number of the flywheel in the conventional system is much lower than that measured by a spin tester.

On the other hand, according to this invention, since the elastic support of a bearing can make the flywheel to rotate around the dynamic center of the gravity thereof as a rotation center, said vibration load by the unbalance does not occur and the bearing is prevented from breaking. The rotation number can be increased to the extent of the rotation number measured by the spin tester, that the flywheel is broken by the stress. By increasing the rotation number of the flywheel, the energy density of the flywheel can be increased and the efficiency of whole the device can be enhanced without enlarging the flywheel in size.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A flywheel-type power storage device including a coreless-type rotary electrical machine comprising:

a stator including a stator frame;

a stator winding fixed to said stator frame;

said stator winding including a plurality of sets of three-phase windings, and having a cylindrical portion;

said sets of three phase windings being isolated from each other;

a rotor having inner and outer field members constituting therebetween a field gap in which said cylindrical portion is positioned, wire portions located in said cylindrical portion and each of said wire portions wound in parallel to an axis of said rotor, wherein at least one of said inner and outer field members is a permanent magnet;

a bearing means provided between said stator and said rotor so as to rotatably support said rotor against said stator, and including a bearing housing supported via an elastic member by said stator frame;

a flywheel positioned outside said outer field member and made of a fiber-reinforced plastic material having reinforcing fibers; and said reinforcing fibers are disposed circumferentially about said flywheel such that an elastic moduli/density increases in a radial direction from an inner portion of said flywheel to an outer portion of said flywheel.

2. A flywheel-type power storage device including a coreless-type rotary electrical machine comprising:

a stator including a stator frame;

a stator winding fixed to said stator frame;

said stator winding having a cylindrical portion;

a rotor having inner and outer field members constituting therebetween a field gap in which said cylindrical portion is positioned, wherein at least one of said inner and outer field members is a permanent magnet; and wire portions located in said cylindrical portion and each of said wire portions wound in parallel to a rotation axis of said rotor;

a bearing means provided between said stator and said rotor so as to rotatably support said rotor against said stator;

said bearing means including a bearing housing supported via an elastic member by said stator frame;

a flywheel positioned outside said outer field member and made of a fiber-reinforced plastic material having reinforcing fibers; and said reinforcing fibers are disposed circumferentially about said flywheel such that said flywheel has increasing elastic moduli/density in a radial direction from an inner portion of said flywheel to an outer portion of said flywheel.

3. A flywheel-type power storage device including a coreless-type rotary electrical machine comprising:

a stator including a stator frame;

a stator winding fixed to said stator frame;

said stator winding having a cylindrical portion;

a rotor having inner and outer field members constituting therebetween a field gap in which said cylindrical portion is positioned, wire portions located in said cylindrical portion and each of said wire portions wound in parallel to an axis of said rotor, wherein at least one of said inner and outer field members is a permanent magnet;

a bearing means provided between said stator and said rotor so as to rotatably support said rotor against said stator;

said bearing means including a bearing housing supported via an elastic member by said stator frame;

a flywheel positioned outside said outer field member and made of a fiber-reinforced plastic material having reinforcing fibers; and said reinforcing fibers are disposed circumferentially about said flywheel such that said flywheel has increasing elastic moduli/density in a radial direction from an inner portion of said flywheel to an outer portion of said flywheel.

4. A flywheel-type power storage device including a coreless-type rotary electrical machine which comprises:

a stator including a stator frame;

a stator winding fixed to said stator frame;

said stator winding having a cylindrical portion;

a rotor having inner and outer field members constituting therebetween a field gap in which said cylindrical portion is positioned, wherein at least one of said inner and outer field members is a permanent magnet;

wire portions located in said cylindrical portion and each of said wire portions wound in parallel to an axis of said rotor;

a bearing means provided between said stator and said rotor so as to rotatably support said rotor against said stator;

said bearing means including a bearing housing supported via an elastic member by said stator frame; and a flywheel positioned outside said outer field member.

5. A flywheel-type power storage device according to claim 4, wherein:

said flywheel is made of a fiber-reinforced plastic material;

said plastic material having reinforcing fibers;

said reinforcing fibers being disposed circumferentially about said flywheel and having higher elastic moduli/ density in a radial direction from an inner portion of said flywheel to an outer portion of said flywheel.

6. A flywheel-type power storage device according to claim 5, wherein:

said bearing means includes an oil pressure control system;

said oil pressure control system including an oil and a spool to bear said rotor in a thrust direction so as to maintain said rotor in said thrust direction at a predetermined equilibrium position.

7. A device according to claim 4, wherein said stator winding has crossover tracks at both ends and through which a wire extended from each of said wire portions is connected to a next wire portion.

8. A device according to claim 5, wherein said reinforcing fibers are at least one member selected from the group consisting of a carbon fiber, a glass fiber and an aramid fiber.

9. A device according to claim 5, wherein said reinforcing fibers comprise carbon fibers having an elastic moduli increasing in said radial direction from said inner portion of said flywheel to said outer portion of said flywheel.

10. A flywheel-type power storage device according to claim 6, wherein said flywheel-type power storage device is disposed in a vacuum container.

11. A flywheel-type power storage device according to claim 10, wherein said stator has a pipe extending outside said vacuum container for passing cooling water.

12. A flywheel-type power storage device including a coreless-type rotary electrical machine which comprises:

a stator including a stator frame;

a stator winding fixed to said stator frame;

said stator winding including a plurality of sets of three-phase windings, and having a cylindrical portion;

said sets of three phase windings being isolated from each other;

a rotor having inner and outer field members constituting therebetween a field gap in which said cylindrical portion is positioned, wire portions located in said cylindrical portion and each of said wire portions wound in parallel to an axis of said rotor, wherein at least one of said inner and outer field members is a permanent magnet;

a bearing means provided between said stator and said rotor so as to rotatably support said rotor against said stator, and including a bearing housing supported via an elastic member by said stator frame; and a flywheel positioned outside said outer field member.

13. A flywheel-type power storage device according to claim 12, further comprising a sensor means for detecting a rotation position or angle of said rotor.

14. A device according to claim 12, wherein said stator winding has crossover tracks at both ends and through which a wire extended from each of said wire portions is connected to a next wire portion.

15. A device according to claim 12, said wherein:

said flywheel is made of a fiber reinforced plastic material;

said plastic material having reinforcing fibers;

said reinforcing fibers being disposed circumferentially about said flywheel and having higher elastic moduli/ density in a radial direction from an inner portion of said flywheel to an outer portion of said flywheel.

16. A flywheel-type power storage device according to claim 13, further comprising an inverter for converting dc voltages to three-phase ac voltages, effective to apply said three-phase ac voltages to said three-phase windings.

17. A flywheel-type power storage device according to claim 16, wherein said stator has n three-phase windings driven with ac voltage waves; and a phase delay between said ac voltage waves to be applied to a first three-phase winding an i-th three-phase winding being 120° (i−1)/n; wherein n is an integer greater than 1, and i is an integer of 1 to n.

18. A flywheel-type power storage device according to claim 17, wherein:

said flywheel is made of a fiber-reinforced plastic material;

said plastic material having reinforcing fibers;

said reinforcing fibers being disposed circumferentially about said flywheel and having higher elastic moduli in a radial direction from an inner portion of said flywheel to an outer portion of said flywheel.

19. A flywheel-type power storage device according to claim 18, wherein:

said bearing means includes an oil pressure control system;

said oil pressure control system including an oil and a spool to bear said rotor in a thrust direction so as to maintain said rotor in said thrust direction at a predetermined equilibrium position.

20. A device according to claim 18, wherein said reinforcing fibers are at least one member selected from the group consisting of a carbon fiber, a glass fiber and an aramid fiber.

21. A device according to claim 18, said wherein said reinforcing fibers comprise carbon fibers having an elastic moduli increasing in said radial direction from said inner portion of said flywheel to said outer portion of said flywheel.

22. A flywheel-type power storage device according to claim 19, wherein said flywheel-type power storage device is disposed in a vacuum container.

23. A flywheel-type power storage device according to claim 22, wherein said stator has a pipe extending outside said vacuum container for passing cooling water.

* * * * *